No. 671,030. Patented Apr. 2, 1901.
J. RAILTON, J. L. McSPADDEN & J. McDONALD.
BICYCLE FRAME.
(Application filed June 16, 1899.)
(No Model.)
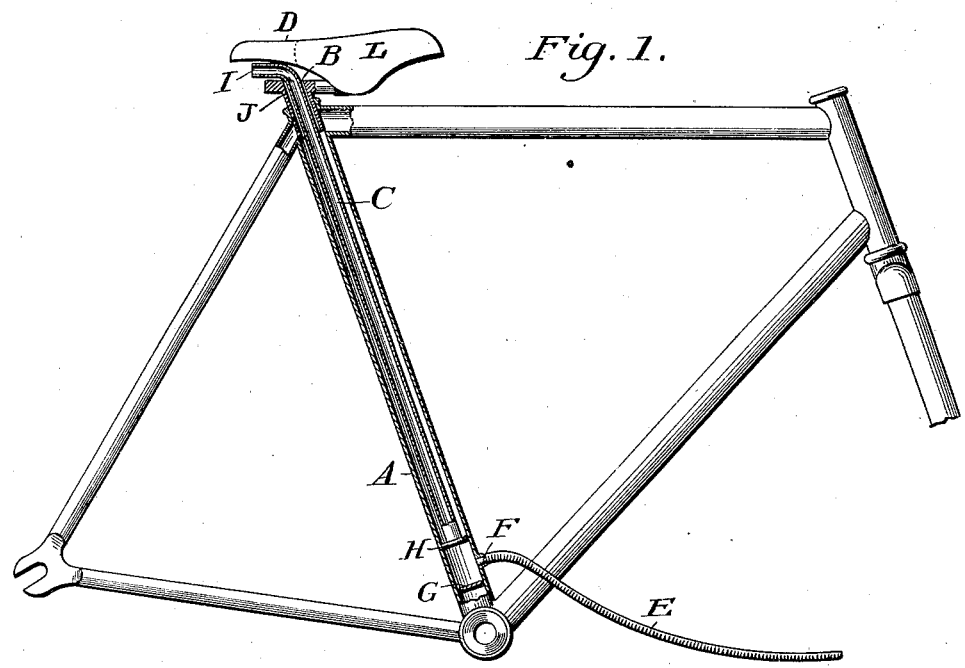
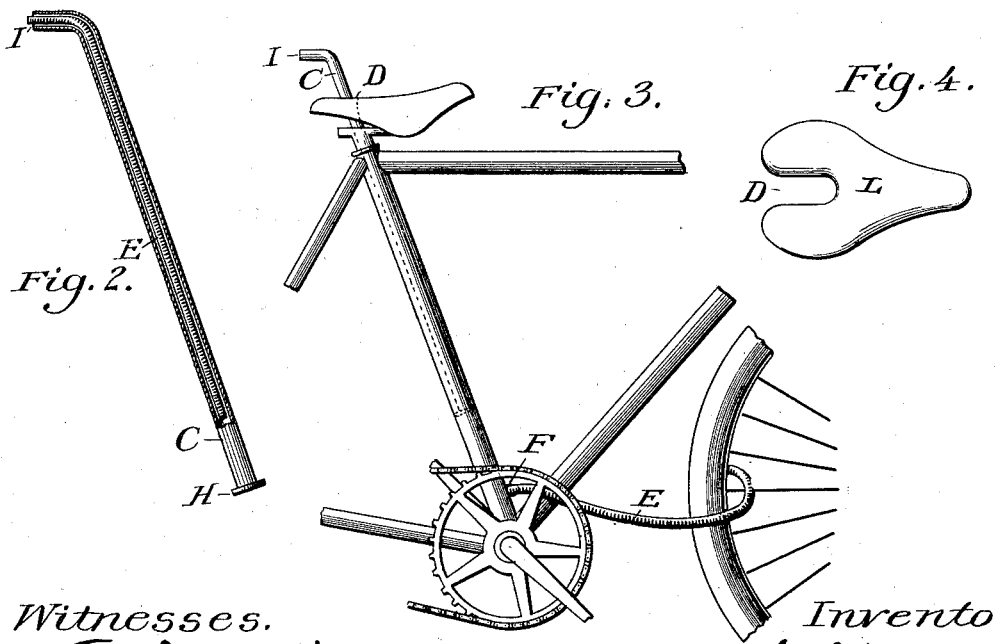
Witnesses.
Inventors
John Railton.
John L. McSpadden
John McDonald

UNITED STATES PATENT OFFICE.

JOHN RAILTON, JOHN L. McSPADDEN, AND JOHN McDONALD, OF DETOUR, MICHIGAN.

BICYCLE-FRAME.

SPECIFICATION forming part of Letters Patent No. 671,030, dated April 2, 1901.

Application filed June 16, 1899. Serial No. 720,790. (No model.)

*To all whom it may concern:*

Be it known that we, JOHN RAILTON, JOHN L. MCSPADDEN, and JOHN MCDONALD, citizens of the United States, residing at Detour, in the county of Chippewa and State of Michigan, have invented a new and useful Improvement in Bicycle-Frames, of which the following is a specification.

The object of the improvement is to combine parts of both a frame and air-pump and so produce both frame and pump into one, and thus remove the necessity of having a separate pump. We attain this object in the manner illustrated in the accompanying drawings.

Figure I shows frame and pump ready to attach to tire-stem. Fig. II shows plunger, hollow plunger-rod, and rubber tube inserted into plunger-rod. Fig. III shows combination in actual use in inflating tires. Fig. IV shows notch in rear part of saddle.

A represents a tube, which forms a part of the bicycle-frame and which is entirely open at its top, but is closed at its bottom by means of the partition G. Just above the partition there is formed an opening, and projecting from the side of this tube around the opening is a nipple F, upon which one end of the rubber tubing E is placed when the tubing is brought into play for the purpose of blowing up either one of the tires of the wheels.

The seat-post J, instead of being made solid in the usual manner, as here shown, is tubular and which fits in the top of the post A. The seat L, which is secured to the seat-post in the usual manner, is provided with an opening D through its rear edge, as shown in Fig. IV, so that the upper end of the hollow piston-rods C can be freely operated without having to displace the seat. The upper end I of this piston-rod C is curved rearwardly, so as to form a handle which rests upon the top of the seat-post when the piston H, secured to the lower end of the rod, is depressed to its greatest extent. The seat-post being hollow, the piston-rod plays freely back and forth therethrough for the purpose of operating the piston H for forcing air through the tubing E into either one of the tires of the bicycle. After the tires have been inflated the rubber tubing is removed from the nipple F, and then it is forced into the hollow piston-rod, as shown in Fig. II, without the necessity of removing any other part of the bicycle than the tubing. When either of the tires is being inflated, the tubing E, which has its upper end to project slightly beyond the upper end of the piston-rod, is withdrawn, and one end of the tubing is connected to the nipple F and the other to the nipple upon the wheel that is to be inflated. The piston is then operated through the hollow piston-rod without having to remove any part of the wheel.

Having thus described our invention, we claim—

In a bicycle, the tube A open at its top, and provided with a partition at its lower end, and with a nipple above the partition, and a hollow seat-post, combined with a seat having an opening through its rear end, a hollow piston-rod having its upper end curved rearwardly so as to form a handle, and having a piston secured to its lower end, and the rubber tubing E which is adapted to be applied to the nipple when one of the wheels is to be inflated, and to be placed inside of the hollow piston-rod when not in use, substantially as shown.

JOHN RAILTON.
JOHN L. McSPADDEN.
JOHN McDONALD.

Witnesses:
GEORGE KENNEDY,
T. H. WATSON.